United States Patent
Magri et al.

(10) Patent No.: US 10,700,805 B2
(45) Date of Patent: Jun. 30, 2020

(54) METHOD AND NETWORK NODE FOR COMMUNICATION OVER A BIDIRECTIONAL COMMUNICATION LINK

(71) Applicant: Telefonaktiebolaget LM Ericsson (publ), Stockholm (SE)

(72) Inventors: Roberto Magri, Montignoso (IT); Alberto Deho, Genoa (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/097,647

(22) PCT Filed: May 6, 2016

(86) PCT No.: PCT/EP2016/060217
§ 371 (c)(1),
(2) Date: Oct. 30, 2018

(87) PCT Pub. No.: WO2017/190806
PCT Pub. Date: Nov. 9, 2017

(65) Prior Publication Data
US 2019/0140762 A1 May 9, 2019

(51) Int. Cl.
*H04J 14/02* (2006.01)

(52) U.S. Cl.
CPC ...... *H04J 14/0216* (2013.01); *H04J 14/0283* (2013.01)

(58) Field of Classification Search
CPC ............... H04J 14/0216; H04J 14/0283
See application file for complete search history.

(56) References Cited

U.S. PATENT DOCUMENTS

| 6,035,080 | A  | * | 3/2000 | Henry | G02B 6/12007 385/16 |
| 6,873,758 | B1 | * | 3/2005 | Carter | G02B 6/29332 385/15 |
| 7,039,271 | B2 |   | 5/2006 | Chamness et al. | |
| 2003/0128984 | A1 |   | 7/2003 | Oberg et al. | |
| 2005/0169633 | A1 | * | 8/2005 | Nakagawa | H04B 10/572 398/85 |
| 2005/0180752 | A1 | * | 8/2005 | Nakagawa | H04J 14/0227 398/83 |

(Continued)

FOREIGN PATENT DOCUMENTS

| EP | 1388963 A2 | 2/2004 |
| EP | 1456981 A1 | 9/2004 |
| WO | 03052978 A1 | 6/2003 |

*Primary Examiner* — Ajay Cattungal
(74) *Attorney, Agent, or Firm* — Sage Patent Group

(57) ABSTRACT

A network node (400) for use with a single-fiber bidirectional communication link comprises a filter (300). The filter (300) comprises at least four ports. A first port (301) is configured to communicate with the single-fiber in a west direction. A second port (303) is configured to communicate with the single-fiber in an east direction. A third port (305) is configured to add/drop in the west direction. A fourth port (307) is configured to add/drop in the east direction. The network node is configured to add a first wavelength (λA) to the west direction and the east direction, and configured to drop a second wavelength (λB) from the west direction and the east direction.

15 Claims, 10 Drawing Sheets

(56) References Cited

U.S. PATENT DOCUMENTS

| | | | |
|---|---|---|---|
| 2011/0031928 A1* | 2/2011 | Soar | F41G 1/34 320/108 |
| 2014/0101711 A1* | 4/2014 | Rakib | H04N 21/6118 725/129 |
| 2015/0086191 A1* | 3/2015 | Boduch | H04J 14/0297 398/2 |
| 2015/0172072 A1* | 6/2015 | Rakib | H04L 12/2885 725/111 |
| 2015/0263835 A1* | 9/2015 | Shattil | H04B 7/026 370/329 |
| 2015/0365934 A1* | 12/2015 | Liu | H04L 5/001 370/329 |
| 2016/0128085 A1* | 5/2016 | Liu | H04J 14/00 398/96 |
| 2016/0308641 A1* | 10/2016 | Zeng | H04B 10/5053 |
| 2017/0005736 A1* | 1/2017 | Gage | H04B 7/024 |
| 2017/0163342 A1* | 6/2017 | Testa | H04L 49/602 |
| 2017/0187483 A1* | 6/2017 | Mansouri Rad | H04J 14/0206 |
| 2017/0237495 A1* | 8/2017 | Lee | H04B 10/2503 398/79 |
| 2017/0279538 A1* | 9/2017 | Sone | H04B 10/2575 |
| 2018/0248797 A1* | 8/2018 | Kim | H04L 12/42 |

* cited by examiner

METHOD AND NETWORK NODE FOR COMMUNICATION OVER A BIDIRECTIONAL COMMUNICATION LINK

TECHNICAL FIELD

The embodiments described herein relate to a method and network node for communication over a bidirectional communication link, for example a single-fiber bidirectional communication link.

BACKGROUND

In communication networks, for example optical communication networks, single-fiber working consists of using a single fiber for bidirectional transmission, instead of using a pair of fibers, one for each direction. One factor for adopting the single-fiber technique is the cost of fiber deployment or renting. The actual cost of a cable and of trenching or aerial mounting a cable is relatively insensitive to the number of fibers in the cable. However, the cost of splicing and the cost of components such as splitters, connectors, couplers and splice enclosures are directly related to the fiber count.

Single-fiber solutions can therefore help reduce the capital and labor costs associated with lighting up a fiber while effectively doubling the number of available fibers. This may be exploited in access networks or in mobile front haul arrangements to reach nodes such as remote radio units (RRU).

Besides exploiting single-fiber transmission, access networks are also mostly based on passive solutions (for example providing no amplification), and as such the insertion loss of passive components (such as multiplexers, add/drop filters, etc.) should be minimized in order to improve the system reach and capacity.

Typically, two functions are performed at Optical Add Drop Multiplexer (OADM) nodes. One function is to ADD/DROP desired channels (typically in a given band) in each direction of a ring (e.g. termed an East direction and a West direction) or a linear connection. Another function is to ADD/DROP the optical supervisory channel (OSC), which is typically in a different band than the one used by service channels. A band may be considered as a frequency band, e.g. a range or set of contiguous or non-contiguous frequencies.

FIG. 1 shows an example of a fixed Optical Add Drop (OAD) filter, for example in the form of a Thin Film Filter (TFF). The filter of FIG. 1 comprises a 3-port device 100, comprising a common port 101, and ADD/DROP port 103 and an express port 105.

The common-to-express path (i.e. between the common port 101 and the express port 105) is based for example on a filter function (illustrated schematically by the dotted line 104) providing reflection of optical signals on a pass-through path. The filter function 104 in reflection provides for low isolation from optical signals on other paths (i.e. to/from the ADD/DROP port). The common-to-drop path (i.e. between the common port 101 and the ADD/DROP port 103) and the add-to-common path (i.e. between the ADD/DROP port 103 and common port 101) are based on the filter function 104 providing transmission of optical signals to/from the ADD/DROP port.

The filter function 104 may provide for a high isolation of the transmitted optical signals. The filter function 104 allows certain wavelengths or a band or set of wavelengths to pass through the filter, while the filter function 104 reflects certain wavelengths or a band or set of wavelengths between one port and another. It is noted that a pass filter may comprise one or more individual filters, for example one filter for adding a particular wavelength and another filter for dropping a particular wavelength.

In such a filter as shown in FIG. 1, to keep the insertion loss on a pass-through path (i.e. between the common port 101 and the express port 105) as low as possible, one such filter can be used to add/drop a composite band (with all the local channels) to the fiber, with additional single-channel filters being appended on the add/drop path (i.e. appended to the add/drop port 103) to select the individual wavelengths.

FIG. 2 shows an example of how a network node, functioning as a OADM node 200, may be implemented using two 3-port OAD filters 100 for the ADD/DROP channels (one for the East and one for the West direction), indicated by WDM band. In addition, the node 200 further comprises two 3-port OAD filters 100 for the OSC channel (again for East and West directions), marked as 1490 nm/1510 nm. The OAD filters 100 have ports 101,103,105 corresponding to the ports described in FIG. 1. The OADM node 200 is connected to one or more further nodes by an optical connection 115, e.g. optical fiber.

The OAD filter $100_1$ is provided for adding/dropping channels (e.g. OSC channels) in a West direction, while the OAD filter $100_4$ is provided for adding/dropping channels (e.g. OSC channels) in an East direction. The OAD filter $100_2$ is provided for adding/dropping data (i.e. service) channels in a West direction, while the OAD filter $100_3$ is provided for adding/dropping data (i.e. service) channels in an East direction.

An add/drop filter 111, for example comprising N single-channel filters, is provided for adding and dropping the data channels. It is noted that in this example the add/drop filter 111 is split towards the OAD filters $100_2$ and $100_3$, which represents the case of ring protection. It is noted that two independent filters 111 could also be provided for the OAD filters $100_2$ and $100_3$, for example if independent traffic is required for West and East directions. Filters $109_1$ and $109_2$ are appended to the respective add/drop ports $103_1$, $103_4$ of the respective OAD filters $100_1$, $100_4$, i.e. in order to help reduce insertion loss on the fiber 115 itself. In other words, the filters $109_1$ and $109_2$ are not coupled directly to the fiber 115, thus reducing the insertion loss on the fiber 115 itself due to these filters.

In FIG. 2 it can be seen that a filter $109_1$, for example a coarse wavelength division multiplexing (CWDM) filter, provides for adding a first wavelength, e.g. having a value 1490 nm, to the West direction, and provides for dropping a second wavelength, e.g. having the value 1510 nm from the West direction. In contrast, a filter $109_2$, for example a CWDM filter, adds the second wavelength e.g. having the value 1510 nm to the West direction, and drops the first wavelength having the value 1490 nm from the West direction.

A disadvantage with the arrangement of FIG. 2 is that there are four cascaded filters per node 200, i.e. $100_1$ to $100_4$, thus increasing the insertion loss of the node. The resulting insertion loss of a chain of such OAD nodes 200 (for example 4 or 8 nodes in a typical network) can strongly affect the available reach of the network. For example, considering 8 nodes and an insertion loss of 0.5 dB for each express path, such an arrangement would result in an insertion loss of 8×4×0.5=16 dB, which is a significant insertion loss.

SUMMARY

It is an aim of the present invention to provide a method and apparatus which obviate or reduce at least one or more of the disadvantages mentioned above.

According to a first aspect there is provided a network node for use with a bidirectional communication link. The network node comprises a filter comprising at least four ports. A first port is configured to optically communicate with the bidirectional communication link in a first direction. A second port is configured to optically communicate with the bidirectional communication link in a second direction. A third port is configured to optically add/drop at least a wavelength in/from the first direction. A fourth port is configured to optically add/drop at least a wavelength in/from the second direction. The network node is configured to add a first wavelength to the first direction and the second direction, and configured to drop a second wavelength from the first direction and the second direction.

Thus, communication over a single bidirectional link is improved, e.g. by a reduction in insertion loss and/or isolation.

Optionally, the first wavelength and second wavelength are transposed compared to a first wavelength and a second wavelength of an adjacent network node coupled to the bidirectional communication link.

Optionally, the network node is configured to add a first set of wavelengths to the first direction and the second direction, and configured to drop a second wavelength or second set of wavelengths from the west direction and the east direction.

Optionally, the first set of wavelengths and second set of wavelengths are transposed compared to a first set of wavelengths and a second set of wavelengths of an adjacent network node coupled to the bidirectional communication link.

Optionally, set of wavelengths comprises an interleaved set of add and drop wavelengths.

Optionally, a first filter module is coupled to the third port, the first filter module being configured to add the first wavelength or a first set of wavelengths to the first direction, and configured to drop the second wavelength or a second set of wavelengths from the first direction. A second filter module coupled to the fourth port, the second filter module being configured to add the first wavelength or a first set of wavelengths to the second direction, and configured to drop the second wavelength or a second set of wavelengths from the second direction.

Optionally, the first filter module and/or the second filter module comprises one or more filters, one or more wavelength division multiplexing, WDM, filters, or one or more coarse wavelength divisional multiplexing, CWDM, filters.

Optionally, the first port is coupled to the third port. Optionally, the second port is coupled to the fourth port.

Optionally, the first port and the second port are coupled via an optical reflected express path. Optionally, the bidirectional communication link comprises a single fiber.

According to another aspect there is provided a method in a network node, for bidirectional communication via a 4-port filter. The method comprises communicating with the bidirectional communication link in a first direction via a first port, and communicating with the bidirectional communication link in a second direction via a second port. The method comprises adding/dropping at least a wavelength in the first direction via a third port, and adding/dropping at least a wavelength in the second direction via a fourth port. The steps of adding/dropping comprise adding a first wavelength or first set of wavelengths to the first direction and the second direction, and dropping a second wavelength or second set of wavelengths from the first direction and the second direction.

Optionally, the first wavelength and second wavelength are transposed compared to a first wavelength and a second wavelength of an adjacent network node coupled to the bidirectional communication link; or the first set of wavelengths and second set of wavelengths are transposed compared to a first set of wavelengths and a second set of wavelengths of an adjacent network node coupled to the bidirectional communication link.

Optionally, using a first filter module, coupled to the third port, to add the first wavelength or first set of wavelengths to the first direction, and to drop the second wavelength or second set of wavelengths from the first direction; and using a second filter module, coupled to the fourth port, to add the first wavelength or first set of wavelengths to the second direction, and to drop the second wavelength or second set of wavelengths from the second direction.

Optionally, adding and/or dropping comprises using one or more filters to filter a wavelength, or using one or more wavelength division multiplexing, WDM, filters to filter a wavelength, or using a coarse wavelength divisional multiplexed, CWDM, filter to filter a wavelength.

Optionally, the bidirectional communication link comprises a single-fiber communication link.

According to another aspect there is provided a communication network comprising at least first and second network nodes coupled by a bidirectional communication link. The first network node and the second network node comprise 4-port filters for communicating via the bidirectional communication link.

Optionally, a 4-port filter of the first network node is configured to add a first wavelength or first set of wavelengths to the bidirectional communication link in both a first direction and a second direction, and drop a second wavelength or second set of wavelengths from a first direction and a second direction; and wherein a 4-port filter of the second network node is configured to add the second wavelength or second set of wavelengths to the bidirectional communication link in both a first direction and a second direction, and drop the first wavelength or first set of wavelengths from the first direction and the second direction.

Optionally, the first network node and the second network node are adjacent nodes along the bidirectional communication link.

Optionally, the bidirectional communication link comprises a single-fiber communication link.

Optionally, the communication network forms part of a fronthaul network and/or wherein the first network node and/or second network node forms part of a fronthaul node.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail.

It is noted that, while certain examples will be described below in the context of a Dense or Coarse Wavelength Division Multiplexing (DWDM or CWDM) physical layer technology, the embodiments may also be used with other physical layer technologies, including for example Wavelength Division Multiplexing (WDM) more generally.

The embodiments will be described in relation to bidirectional communication, for example single-fiber bidirectional transmission, i.e. whereby a same single fiber is provided for transmitting a first plurality of channels in one direction, and a second plurality of channels in the other direction. For example, a set of optical wavelengths being used to transmit a group of channels in one direction, and another set of optical wavelengths being used to transmit a group of channels in another direction.

In a bidirectional single-fiber system, first and second wavelengths are used to deliver a single service, i.e. one wavelength for an upstream direction of that service, and one wavelength for a downstream direction of that service. It is noted that a transmit (TX) direction for a particular node may correspond to a direction in which data or signals are being added to a single-fiber via that node, while a receive (RX) direction for a particular node may correspond to a direction in which data or signals are being dropped from a single-fiber via that node.

Figure 3:
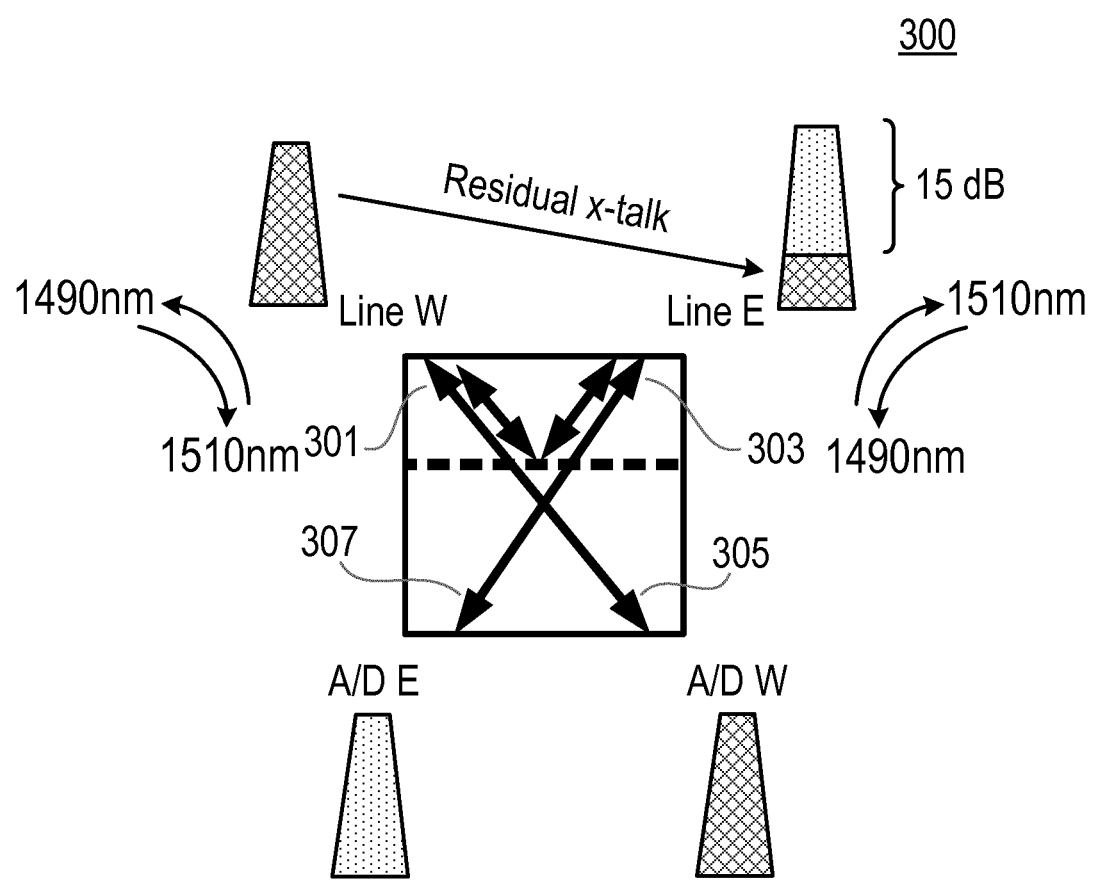
FIG. 3 shows an example of a 4-port filter according to an embodiment.

FIG. 3 shows a schematic diagram of a 4-port filter 300. The 4-port filter 300 comprises a west port 301, an east port 303, a west add/drop port 305 and an east add/drop port 307. Such a 4-port filter 300 provides two filter functions in the same component with a single reflected express path. Such filter functions are configured to integrate both add and drop functions within a single filter. The single 4-port filter is configured to allow add/drop of one or more channels in each (i.e. both) connection direction, and pass through of one or more optical channels (i.e. wavelengths) in either direction. The one or more channel for add/drop is transmitted through the filter (dashed line), and the one or more channel for pass-through is reflected by the filter.

Figure 1:
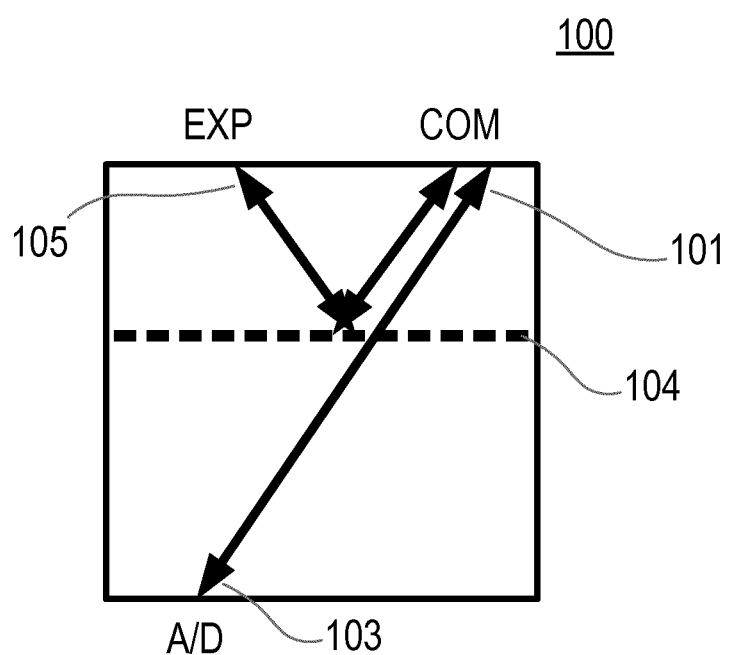
FIG. 1 shows an example of a 3-port filter.
Figure 2:
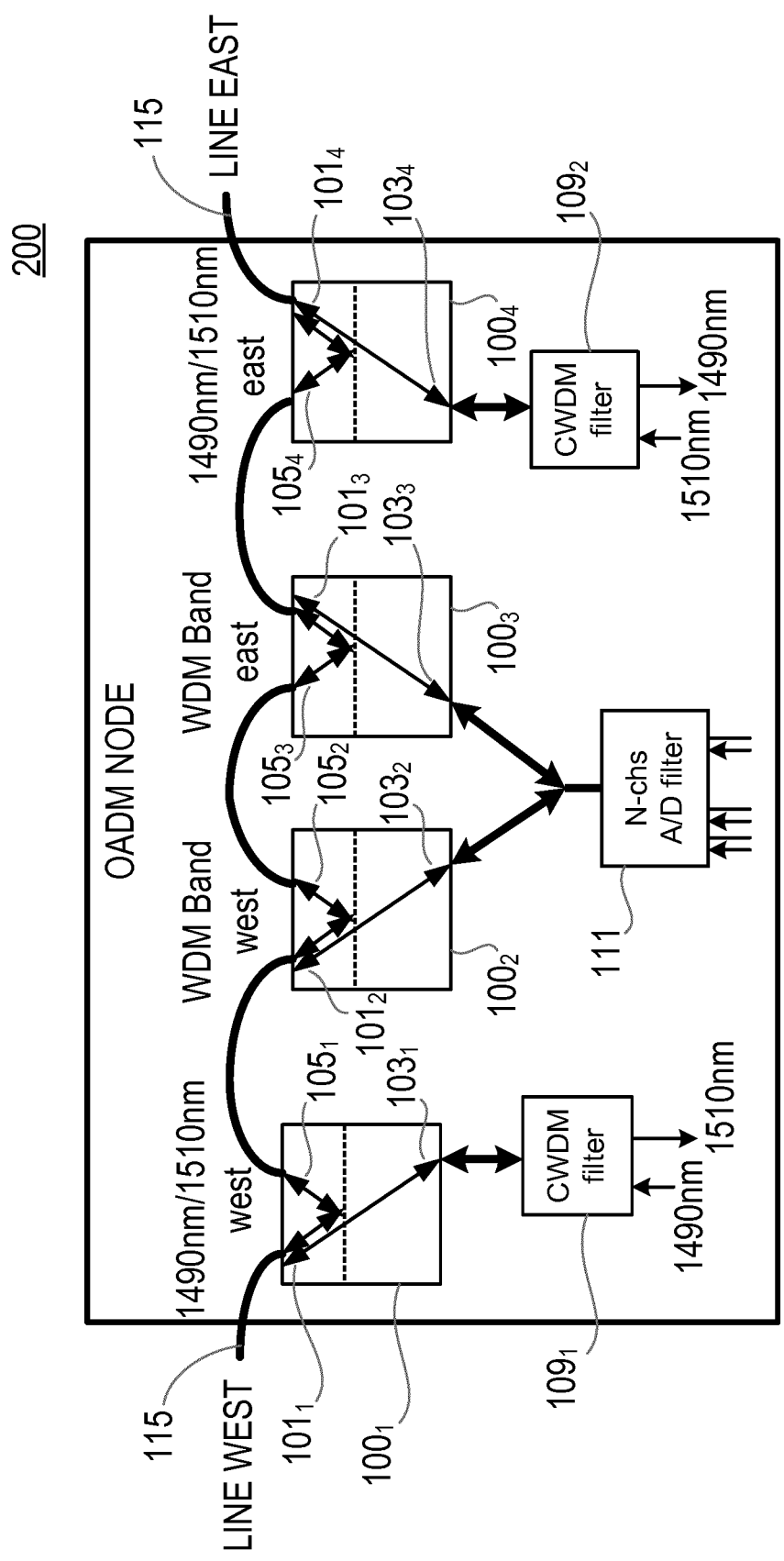
FIG. 2 shows an example of a network node having a cascade of 3-port filters.

Such a 4-port filter may be used for both the respective data channels and OSC (OAD and OSC filters) in the arrangement of FIG. 2, the number of cascaded filters is halved, e.g. by combining separate 3-port filters for each direction into a single 4-port filter. For example, by reference to FIG. 2, this corresponds to combining 100₁/100₄ into one 4-port OSC filter, and combining 100₂/100₃ into one 4-port data channel filter. This results in a halving of the component insertion loss.

The 4-port filter of FIG. 3, used as a direct replacement for the 3-port filters of FIG. 2, may suffer from the poor isolation of the express path (typically only 15 dB), which would cause high cross-talk penalties. The cascade of two 3-ports filters shown in FIG. 2 would benefit from a two-fold filtering effect which doubles the isolation, whereas the use of single 4-port devices allows for only a single pass reflection filtering effect with relatively poor isolation. In other words, the channel added westward will suffer from interference from a residual of the channel dropped from the east line, with the same degrading effect experienced the other way around, as illustrated by the signal components in FIG. 3 (which shows a residual cross-talk from the west direction being added to the channel in the east direction).

This is less of an issue in dual-fiber systems since one of such filters is placed westward and one is placed eastward, so the pass-through traffic experiences twice the isolation. However, in a bidirectional operation on a single-fiber, where one 4-port filter is required for add/drop in both west and east directions, the improvement in insertion loss may be accompanied by a degrading effect on isolation. An example of the disclosure provides the arrangement using one or more 4-port filter at a node for add/drop and pass-through of optical channels on a bidirectional operation on a single-fiber.

The embodiments described herein provide solutions which help reduce the insertion loss of optical add drop multiplexing (OADM) nodes in single-fiber bidirectional networks, including bidirectional communication links such as single-fiber bidirectional passive networks. Aspects provide a method and network node which provide low loss in a single-fiber bidirectional communication architecture. The embodiments may be used, for example, as part of an optical fronthaul in a communications network, such as a 4G or 5G mobile network or radio access network. For example, the network may provide for optical communication between a node serving a remote radio unit and a same or different type of node serving a baseband processing unit. As such a network node may be considered as a remote radio unit node or a baseband processing (or digital unit) node. The bidirectional communication link (e.g. fiber) and nodes may be considered as part of a fronthaul network. The data carried by the optical signals may be radio data, e.g. digitized radio data for transmission or received by a radio access network. In some aspects, the nodes may be considered as providing communication between remote parts of a base station. Alternatively, the nodes may be used in another part of the access network, backhaul network or core network, or any communication network.

Some embodiments described herein help reduce isolation issues, by exploiting the fact that a bidirectional communication link, for example a single-fiber operation, requires that different wavelengths are used in transmission and reception for a given transceiver to avoid Rayleigh scattering cross-talk.

The embodiments of the present invention make use of a 4-port filter with a bidirectional communication link architecture, e.g. a single-fiber bidirectional architecture. Embodiments are configured to alternately invert the transmission (TX) and reception (RX) wavelengths (e.g. by alternating the ADD and DROP wavelengths at adjacent nodes) when reusing the same wavelengths on an adjacent link section. This alternating of wavelengths may assist in improving isolation of the optical channels. In this way, the relatively poorly-isolated cross-talk wavelength will overlap to the newly added wavelength only after two filter passages (instead of one) so the isolation becomes the same as in the traditional two filter cascade. This is described in more detail below.

Figure 4A:
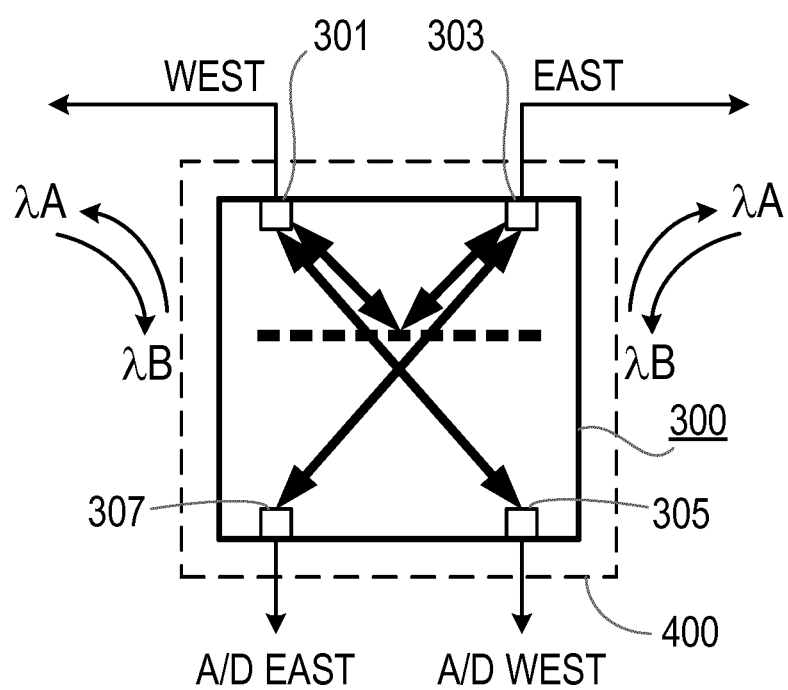
FIG. 4A shows an example of a network node according to an embodiment.

FIG. 4A shows an example of a network node 400 for use with a bidirectional communication link, for example a single-fiber bidirectional communication link. The network node is configured or adapted to optically communicate with a single bidirectional communication link. The network node 400 comprises a filter 300 comprising at least four ports. A first port 301 is configured to optically communicate with the bidirectional communication link in a first direction, e.g. a West direction. A second port 303 is configured to optically communicate with the bidirectional communication link in a second direction, e.g. an East direction. A third port 305 is configured to optically add/drop at least a wavelength in/from the first (e.g. West) direction. A fourth port 307 is configured to optically add/drop at least a wavelength in/from the second (e.g. East) direction. The network node comprises an arrangement of ports to provide optical communication with the single bidirectional communication link in each link direction, e.g. a single optical fiber extending in two directions from the network node. In some aspects, references to single fiber may be considered to refer to communication according to the described examples on only the single fiber.

The network node 400 is configured to add a first wavelength, e.g. λA, to the first (e.g. West) direction and the second (e.g. East) direction, and configured to drop a second wavelength, e.g. λB from the first (e.g. West) direction and the second (e.g. East) direction. In this way, at a particular node the same first wavelength is added in both directions. In other words, the network node is configured to add the same first wavelength to both a bidirectional link (e.g. single optical fiber) extending from the network node in the first direction (e.g. west) and extending from the network node in the second direction (e.g. east). In addition, the same second wavelength, different to the first wavelength, is dropped from both directions. As such, the sections of bidirectional communication link (e.g. single optical fiber) extending in each direction are both used to carry the same second wavelength to be dropped (i.e. received at the network node). The network node 400 is configured to receive the same second wavelength at a drop port from both of the bidirectional communication link sections (e.g. single optical fiber) in communication with the network node 400. This enables an adjacent network node in the communication link, as will be described later, to invert or swap or transpose these particular first and second wavelengths, in order to assist in reducing the isolation loss.

It is noted that in some embodiments described herein, the network node 400 may be configured to be coupled to a bidirectional communication link, e.g. a link/fiber, and may comprise other components (not shown), for example transmitters and receivers arranged to transmit in both directions along the same link/fiber. References to first and second directions in the context above (and other embodiments below) refer to first and second directions of the link, e.g. the West and East connections, and not necessarily the direction of optical signals carried in the link.

Although the embodiment above refers to a single wavelength being added or dropped, it is noted that the same is applicable to a set or band of wavelengths being added or dropped, for example a first set of wavelengths λA' (not shown) or a second set of wavelengths λB' (not shown). The network node 400 may therefore be configured to add a first set of wavelengths λA' to the first (e.g. West) direction and the second (e.g. East) direction, and configured to drop a second set of wavelengths λB' from the first (e.g. West) direction and the second (e.g. East) direction. In a similar way to the above, this enables an adjacent network node in the communication link, as will be described later, to invert or swap these particular first and second sets of wavelengths, in order to help reduce the isolation loss. It is noted that, in some examples, the set of wavelengths comprise a set of interleaved add and drop wavelengths.

As will be described below, a configuration according to FIG. 4A enables isolation to be improved, while also obtaining the advantages of reduced insertion loss by using a 4-port filter.

Figure 4B:
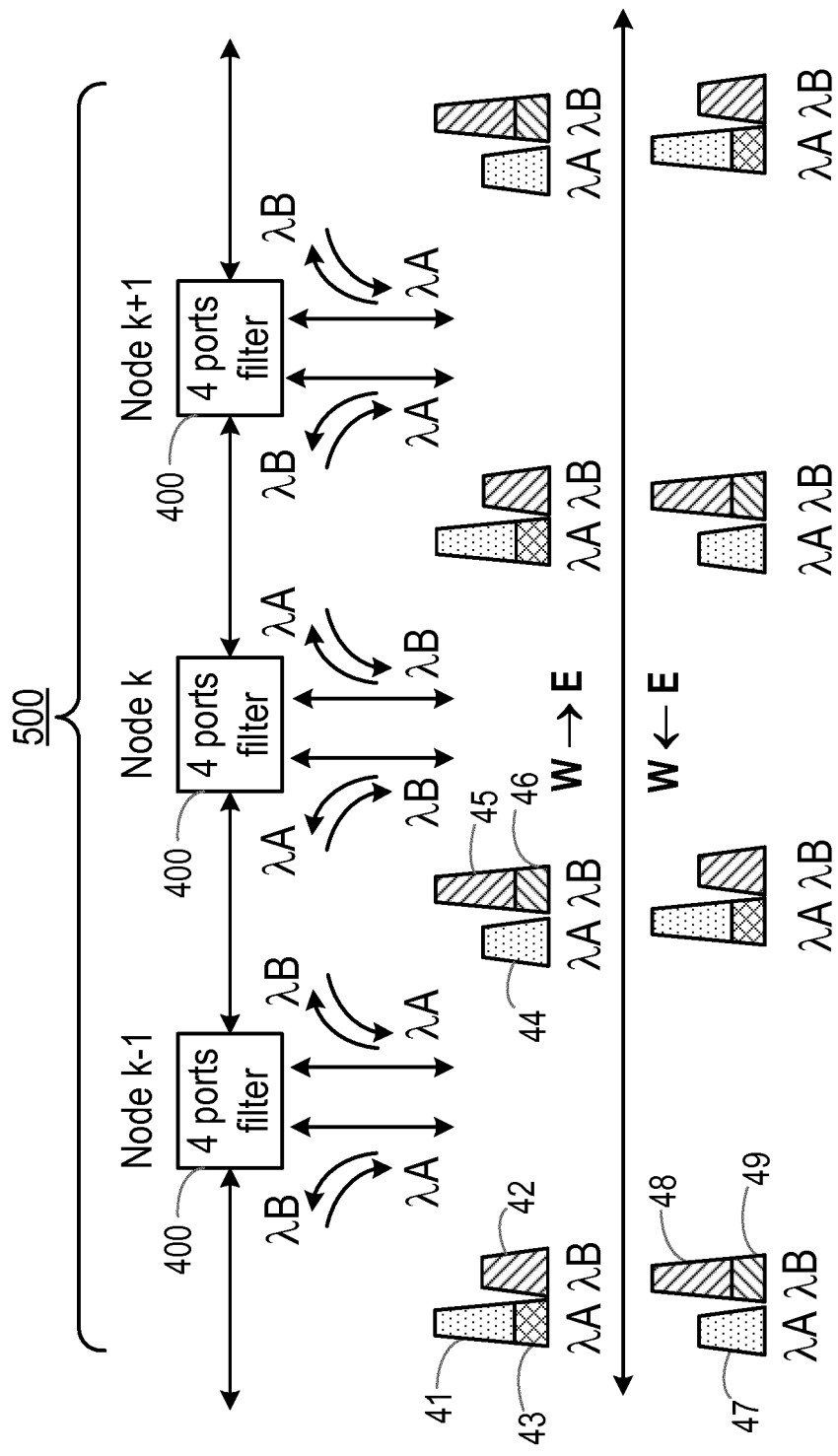
FIG. 4B shows an example of a network comprising network nodes according to FIG. 4A.

FIG. 4B shows an example of a network 500 according to an embodiment, wherein the network comprises a plurality of network nodes 400, for example as described above in FIG. 4A. A first network node k−1 is configured to drop a first wavelength λA from a first (e.g. West) direction, and drop the same first wavelength λA from the second (e.g. East) direction. The first network node k−1 is also configured to add a second wavelength λB to the first (e.g. West) direction, and add the same second wavelength λB to the second (e.g. East) direction.

A second network node k, adjacent to the node k−1 in the communication link, is configured to drop the second wavelength λB from a first (e.g. West) direction, and drop the same second wavelength λB from the second (e.g. East) direction. The second network node k is also configured to add the first wavelength λA to the first (e.g. West) direction, and add the same first wavelength λA to the second (e.g. East) direction.

A third network node k+1, adjacent to the node k in the communication link, is configured to drop the first wavelength λA from a first (e.g. West) direction, and drop the same first wavelength λA from the second (e.g. East) direction. The third network node k+1 is also configured to add the second wavelength λB to the first (e.g. West) direction, and add the same second wavelength λB to the second (e.g. East) direction.

From the above it can be seen that the embodiment combines the use of 4-ports filters (which offer low cost and low insertion loss) with an add/drop scheme based on alternative swapping of TX (add) and RX (drop) wavelengths (or sets of wavelengths) along the link. Adjacent nodes therefore alternate add and drop wavelengths (or sets of wavelengths). The network nodes are configured to add a particular wavelength (or set of wavelengths) in both directions of link and drop a different wavelength (or set of wavelengths) from both directions. It is noted that while FIG. 4B shows the arrangement for a particular pair of wavelengths λA, λB, the same can be applied to a plurality of other sets of wavelengths, for example corresponding to one or more other service channels. The scheme can be applied to sets of wavelengths within a particular frequency band, including for example sets of interleaved wavelengths.

Considering, for example, a West-to-East direction (first-to-second direction), FIG. 4B shows that the second wavelength λB is transmitted between nodes k−1 and k, while the first wavelength λA is transmitted between nodes k and k+1 and so on. The opposite is done for the East-to-West (second-to-first) direction.

It can be seen from the illustrations of the spectra shown below the nodes of FIG. 4B that each wavelength is dropped only after its cross-talk has been reduced twice by the filters. Considering the spectra of the wavelengths in the West-to-East direction (i.e. the W→E shown above the line in FIG. 4B), the dotted area 41 corresponds to the spectra of the first wavelength λA (i.e. which has been added by the previous node (i.e. a node, not shown, to the left side of node k−1), while the cross hatching area 42 (inclined towards the left) corresponds to the remnant of the second wavelength λB after passing the filter in the previous node (i.e. after passing a node, not shown, to the left side of node k−1). The cross hatched area 43 corresponds to the remnants of the first wavelength λA after passing the filter in the previous node (i.e. after passing a node, not shown, to the left side of node k−1). Thus, the spectrum 43 is the preceding one (in the sense of propagation) lowered by a small amount (the isolation), having superimposed thereon the wavelength added at that previous node in this direction (the taller area 41).

In a similar manner, the dotted area 44 corresponds to the remnant of the first wavelength λA after passing the node k−1 in this direction, while the cross hatching area 45 corresponds to second wavelength λB added at node k−1. The cross hatching area 46 corresponds to the remnant of the second wavelength λB (cross hatching area 42) after passing the node k−1 in this direction.

Considering the spectra of the wavelengths in the East-to-West direction (i.e. the W←E shown below the line in FIG. 4B), the cross hatched area 48 corresponds to the spectra of the second wavelength λB, while the cross hatched area 49 (inclined towards the right) corresponds to the remnants of the second wavelength λB after passing the previous node (i.e. after passing the node k−1) in this East-to-West direction. The dotted area 47 corresponds to the remnant of the first wavelength λA after passing the previous node (i.e. after passing the node k−1) in this direction.

From the example of FIG. 4B it can be seen that the first wavelength λA and second wavelength λB of a node, e.g. node k, are transposed compared to the first wavelength and the second wavelength of an adjacent network node coupled to the single-fiber, e.g. node k−1 or k+1. Similarly, if a set of wavelengths are being filtered, the same arrangement could be used, whereby the first set of wavelengths λA' and second set of wavelengths λB' of a node, e.g. node k, are transposed compared to a first set of wavelengths and a second set of wavelengths of an adjacent network node coupled to the single-fiber, e.g. node k−1 or k+1. By transposed it is meant that the wavelength(s) being added or dropped are alternated or swapped in adjacent nodes. In a similar manner, a set of interleaved wavelengths may be transposed between one node and an adjacent node.

Thus, in the embodiment of FIG. 4B it can be seen that the same wavelength is not dropped from one direction and added in the other direction. The same wavelength is not dropped from one section of bidirectional link extending from the network node in the first direction, and added to another section of bidirectional link extending from the network node in the second direction. Also, the same wavelength is not both added to and dropped from a same section of bidirectional link. In other words, different optical signals using the same wavelength are not transmitted in opposite signal directions on the same section of bidirectional link. Each link section carries signals in both directions (bi-directional), but not of the same wavelength.

In some aspects, a node adds a first wavelength but not a second wavelength (in either/both link directions), and receives a second wavelength but not a first wavelength (in either/both link directions). From the embodiment of FIG. 4B it is also noted that adjacent links (links from a node in different directions) carry a first wavelength in opposite directions only. It is also noted from FIG. 4B that added wavelengths are different to dropped wavelengths, or that a wavelength dropped in a first direction is different to a wavelength added in a second direction. It is also noted from FIG. 4B that a particular network node is configured such that a first wavelength (e.g. λA) is only added to the first direction and the second direction at that network node (and not dropped at that network node), and configured such that a second wavelength (e.g. λB) is only dropped from the first direction and the second direction at that network node (i.e. not added at that network node).

Figure 4C:
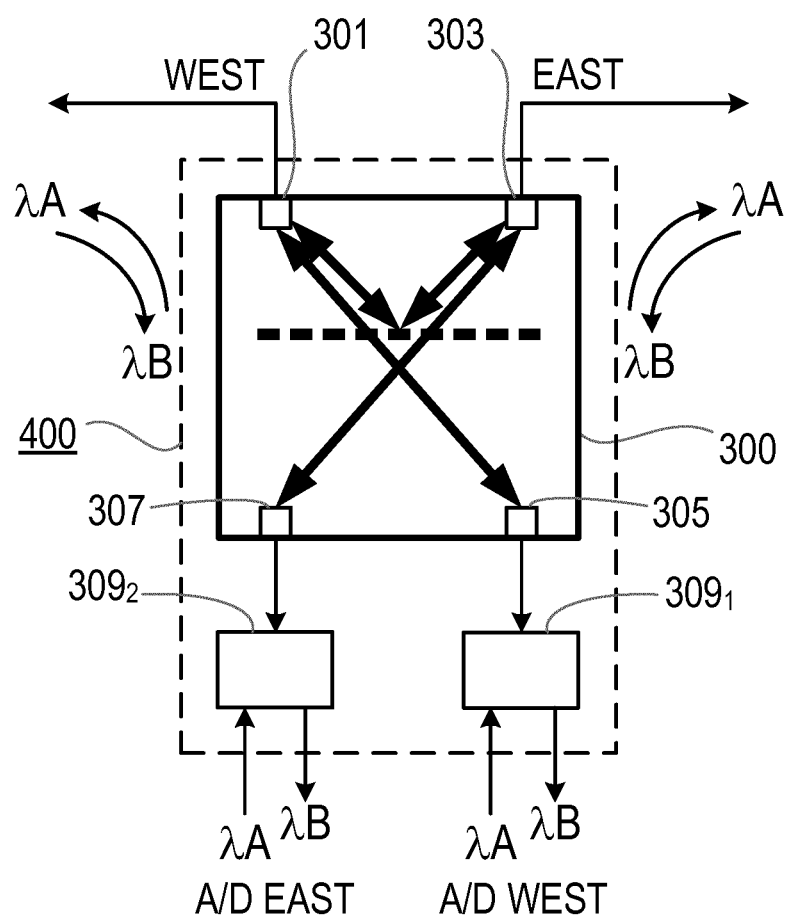
FIG. 4C shows an example of network node according to another embodiment.

FIG. 4C shows an example of another network node 400. The network node 400 of FIG. 4C comprises a 4-port filter 300 as described in FIG. 4A. The network node further comprises a first filter module 309₁ coupled to the third port 305 of the 4-port filter 300. The first filter module 309₁ is configured to add the first wavelength λA (or first set of wavelengths λA') to the West direction (first direction), and configured to drop the second wavelength λB (or second set of wavelengths λB') from the West (first) direction. The first filter module 309₁ may comprise one or more filter elements or functions, for example a first filter function for adding the first wavelength λA (or a set of first filters for adding the first set of wavelengths λA') and a second filter function for dropping the second wavelength λB (or set of second filters for dropping the second set of wavelengths λB'). The network node 400 further comprises a second filter module 309₂ coupled to the fourth port 307 of the 4-port filter 300. The second filter module 309₂ is configured to add the first wavelength λA (or first set of wavelengths λA') to the East direction (second direction), and configured to drop the second wavelength λB (or second set of wavelengths λB') from the East (second) direction. As above, the second filter module 309₂ may comprise one or more filter elements or functions.

The first filter module 309₁ and/or the second filter module 309₂ may comprise one or more wavelength division multiplexing (WDM) filters, including for example one or more coarse wavelength divisional multiplexing (CWDM) filters. Other filters may also be used.

In the examples of FIGS. 4A and 4C, it is noted that the first port 301 is coupled to the third port 305, and that the second port 303 is coupled to the fourth port 307. The first port 301 and the second port 303 may be coupled via an optical reflected express path. In such an example, the 4-port filter 300 provides (or inscribes) two filter elements or functions (dashed line), e.g. first and second pass-filter functions between the first port 301 and third port 305, and between the second port 303 and the fourth port 307, which are optionally implemented in the same component. The filter 300 further provides a single reflected express path, e.g. the filter functions having a reflecting response between the first port 301 and the second port 303. It is noted that the pass-filter functions and reflecting filter functions per se may be designed using known techniques.

The embodiments shown in FIGS. 4A, 4B and 4C therefore overcome the disadvantage of the poor isolation on the express path of 4-ports filters, since the same wavelength is reused on the same propagation direction only after two filter passages. The resulting isolation is thus twice the isolation of a single 4-port filter.

The embodiments may be used in any form of bidirectional communication architecture, including for example bidirectional communication links comprising single-fiber bidirectional communication links.

Figure 5:
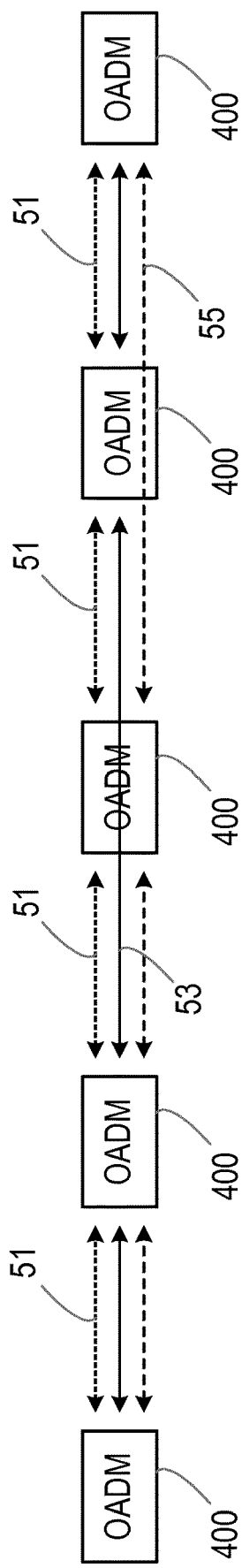
FIG. 5 shows an example of a linear network architecture.

FIG. 5 shows an example of a plurality of network nodes 400, such as optical add drop multiplexers, OADMs, coupled in a linear links architecture. The nodes are arranged such that a communication from one node to another node has only one route, e.g. passing through any intermediate nodes. Unlike in a ring arrangement, there is not an alternative path (e.g. alternate direction around a ring). Such a scheme can be used in linear links architecture with an arbitrary number of OADM nodes and traffic matrix (traffic allocation) when wavelengths are re-used. The dotted lines represent a first single-fiber bidirectional communication, the solid lines a second single-fiber bidirectional communication, and the dashed lines a third single-fiber bi-directional communication.

From FIG. 5 it can be seen that the network nodes that utilize the alternate wavelength scheme described above in combination with 4-port filters may comprise nodes that are adjacent, in some examples, both in terms of communication and physicality. This is illustrated by the dotted lines 51 which show that each of the OADM nodes communicate directly with each of their immediately adjacent neighbors in the linear link architecture. The solid and dashed lines, however, show that, in some examples, an adjacent node in relation to communication according to the present embodiments need not necessarily be a physically adjacent node, but a node which is adjacent in communication terms only. For example, this is illustrated by the solid line 53 of FIG. 5, which shows that an adjacent OADM node in communication terms is not necessarily an adjacent node in physical terms. The same is illustrated by the dashed line 55 of FIG. 5.

Figure 6:
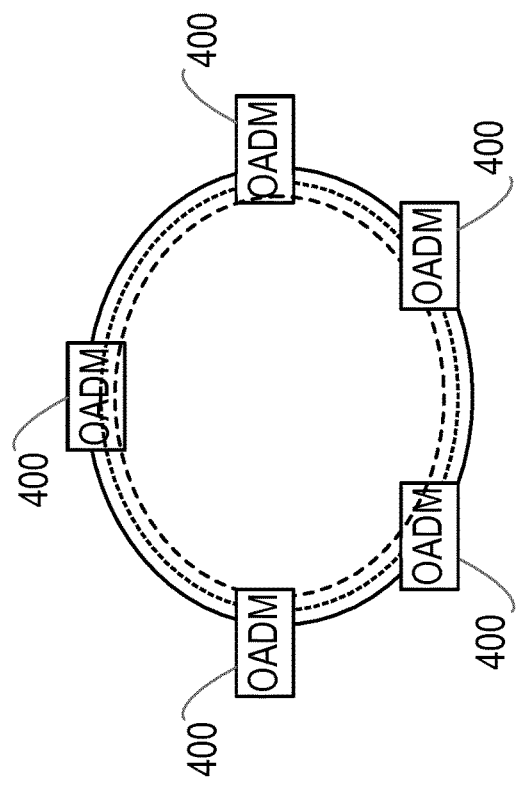
FIG. 6 shows an example of a ring network architecture.

FIG. 6 shows an example of a plurality of network nodes 400, such as optical add drop multiplexers, OADMs, coupled in a ring architecture. The OADM may be implemented by one or more filter 300 as described. The OADM may be configured to add/drop one or more optical data channel (e.g. WDM channels) and/or one or more OSC. The ring architecture may comprise a protected ring, or an unprotected ring. The dotted lines represent a first single-fiber bidirectional communication, the solid lines a second single-fiber bidirectional communication, and the dashed lines a third single-fiber bidirectional communication. As with FIG. 5 above, FIG. 6 illustrates how the network nodes may comprise network nodes that are adjacent nodes both in terms of communication and physicality, or network nodes which are adjacent nodes only in relation to communication.

Figure 7:
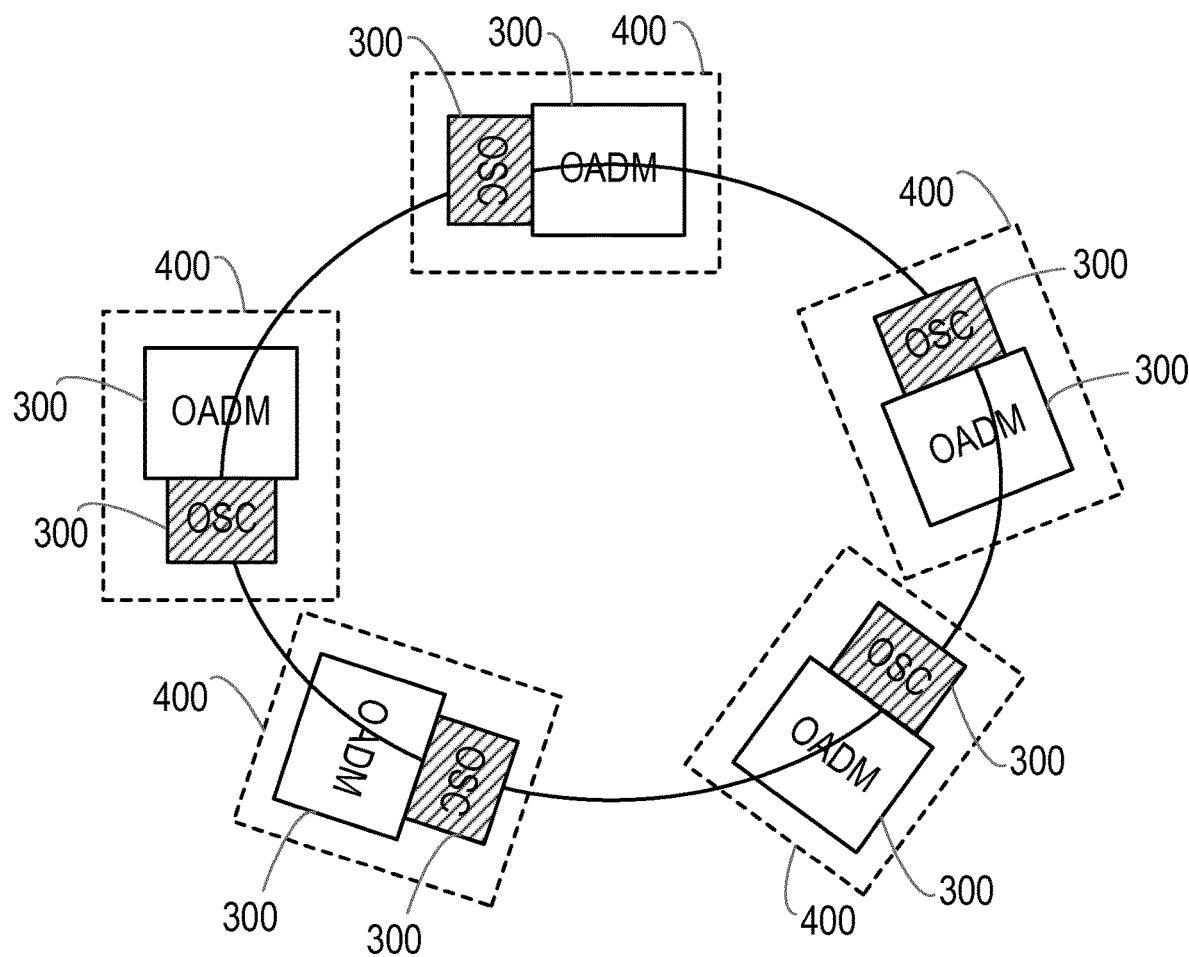
FIG. 7 shows another example of a ring network architecture.

FIG. 7 shows an example in which an optical supervisory channel, OSC, is also used. The embodiments described herein may be used to Add and Drop an OSC, since the OSC re-uses the same wavelengths at each link section, as described further in FIG. 8 below. A network node 400 comprises a filter 300 for the data channel and a filter 300 for the OSC.

Figure 8:
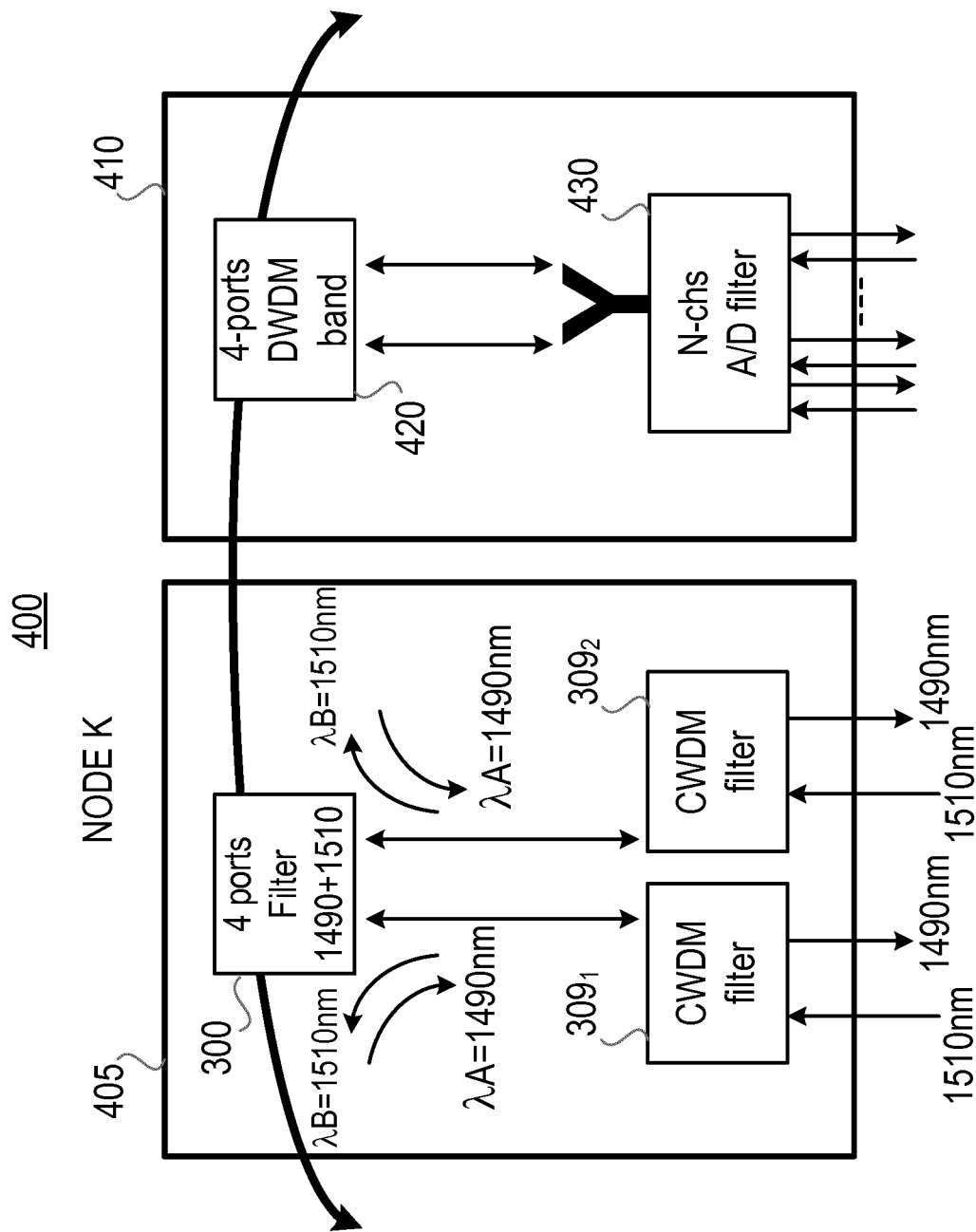
FIG. 8 shows another example of a network node according to an embodiment.

FIG. 8 shows a network node 400 (e.g. node k of FIG. 4B), corresponding for example to a network node as described above in FIG. 4C, being used in an application relating to OSC management on passive optical rings, for example in a fronthaul network. The network node 400 comprises a first module 405 and a second module 410.

A network node 400 for providing the function of an OSC OAD filter is based on a first module 405 comprising a 4-port OAD filter 300 on the main pass-through path where low insertion loss is required. The 4-port filter 300 operates on a passband which, in this example, includes two CWDM wavelengths (e.g. 1490 nm+1510 nm). The 4-port filter 300 is configured as described above, such that a first wavelength (1510 nm in this example) is added in both the West and East directions, while a second wavelength (1490 nm in this example) is dropped from both the West and East directions. The network node 400 will have its wavelengths swapped in relation to an adjacent communication node (not shown).

The first module 405 of the network node 400 also comprises two 3-ports OAD filter modules $309_1$ and $309_2$ appended to the add/drop ports of the 4-port filter 300 in order to separate the first and second wavelengths (e.g. 1490 nm and 1510 nm according to this example) in both directions.

The network node 400, when acting as an OSC filter, further comprises a second module 410 cascaded with the first module 405, wherein the second module 410 is configured to function as a channel OAD filter, for example a (Dense) Wavelength Division Multiplexing, (D)WDM filter, e.g. realized using a 4-port filter 420 whose passband is centered on the wavelengths to be added-dropped at the given node). The 4-port filter 420 may be as described for the 4-port filter 300. The bandwidth of the filter 420 may be the same as that of an adjacent node. Inversion of wavelengths may be provided between added and dropped wavelengths within the same band. The structure of the second module 410 is similar to that of the first module 410, although the transceivers are connected differently in this example. This is because the single channel filters 430 are bidirectional in this example, which means they can both add and drop.

It is noted that the filters 300/420 can be used to replace the four 3-port filters shown in FIG. 2.

The network node 400 may be configured to transmit and receive optical data channels (e.g. WDM channels). In a further example, the network node 400 may be configured to transmit and receive OSC channels. In a further example, the network node 400 may be configured to transmit and receive both data channels and OSC channels (e.g. by use of two 4-port filters or modules). Any example may comprise the function of pass-through of channels, which are not added or dropped (e.g. by use of the reflection component of the filter element in the 4-port filter).

Figure 9:
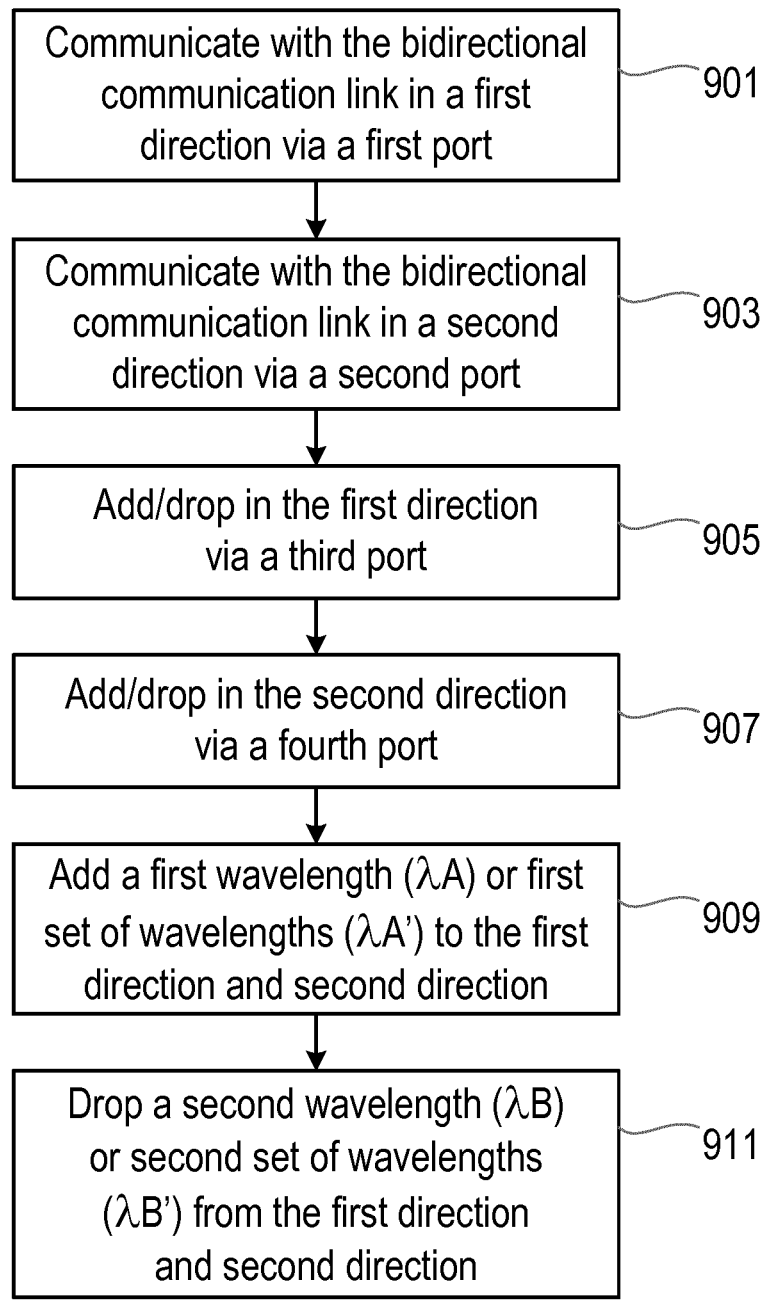
FIG. 9 shows an example of a method according to an embodiment.

FIG. 9 shows an example of a method according to an embodiment, for bidirectional communication via a four port filter, for example over a single-fiber bidirectional communication link. The method comprises communicating with the bidirectional communication link in a first (e.g. West) direction via a first port, step 901. The method comprises communicating with the bidirectional communication link in a second (e.g. East) direction via a second port, step 903. The method comprises adding/dropping in the first (e.g. West) direction via a third port, step 905, and adding/dropping in the second (e.g. East) direction via a fourth port, step 907.

The method further comprises adding a first wavelength λA, or first set of wavelengths λA' to the first (e.g. West) direction and the second (e.g. East) direction, step 909, and dropping, 911, a second wavelength λB, or second set of wavelengths λB' from the first (e.g. West) direction and the second (e.g. East) direction.

In one embodiment, the first wavelength λA and second wavelength λB are transposed compared to a first wavelength and a second wavelength of an adjacent network node coupled to the bidirectional communication link, e.g. single-fiber. In another embodiment, a first set of wavelengths λA' and second set of wavelengths λB' are transposed compared to a first set of wavelengths and a second set of wavelengths of an adjacent network node coupled to the bidirectional communication link, e.g. single-fiber.

The method may comprise using a first filter module $309_1$, coupled to the third port 305, to add the first wavelength λA, or first set of wavelengths λA' to the first (West) direction, and to drop the second wavelength λB, or second set of wavelengths λB' from the first (West) direction. The method may comprise using a second filter module 309₂, coupled to the fourth port 307, to add the first wavelength λA, or first set of wavelengths λA' to the second (East) direction, and to drop the second wavelength λB, or second set of wavelengths λB' from the second (East) direction.

According to another embodiment, there is provided a communication network comprising at least first and second network nodes coupled by a bidirectional communication link, for example a single-fiber bidirectional communication link. The first network node and the second network node comprise 4-port filters for communicating via the bidirectional communication link.

In embodiments of such a communication network, a 4-port filter of the first network node is configured to add a first wavelength or first set of wavelengths to the bidirectional communication link in both a first (e.g. West) direction and a second (e.g. East) direction, and drop a second wavelength or second set of wavelengths from a first (e.g. West) direction and a second (e.g. East) direction. The communication network further comprises a second network node which is configured to add the second wavelength or second set of wavelengths to the bidirectional communication link in both a first (e.g. West) direction and a second (e.g. East) direction, and drop the first wavelength or first set of wavelengths from the first (e.g. West) direction and the second (e.g. East direction). As such, a first and second wavelength or sets of wavelengths added and dropped respectively at a first node are inverted or swapped compared to the first and second wavelengths or sets of wavelengths at a second node, adjacent in communication to the first node. The swapping or inversion may be performed by connecting to the TX of one wavelength or the other (and the same for RX).

The embodiments described herein may be used for single-fiber bidirectional passive optical networks. The embodiments enable the insertion loss and component number to be reduced, for example halved, thus reducing cost of OADM nodes, by combining 4-port dual filters and an alternate wavelengths swapping technique. The embodiments may be used for introducing OSC in fronthaul products and networks.

The embodiments described herein have an advantage of halving the loss and number of filters of OADM nodes in single-fiber working systems where cascaded OAD reusing same wavelengths are exploited. This has the further advantage of improving the reach in a network (and the saved loss can be spent in additional distance). The embodiments help reduce the impact of introducing OSC connectivity in access networks, e.g. halving the additional OSC filter loss.

The footprint of the passive infrastructure is also reduced.

It is noted that the embodiments described herein are applicable to all bidirectional communication links, e.g. single-fiber cases, where the same couple of wavelengths (or wavelength sets) is used in adjacent sections.

For example, the embodiments may be used in adjacent traffic connections in point-to-point links with multiple OAD nodes, or in OSC connections between nodes in any topology, or in ring networks, e.g. ring networks with unprotected traffic, or in protected ring networks having client protection.

The embodiments described above may be used, for example, in optical fronthaul networks or nodes, for example to add OSC management functionalities to ring and cascaded OADM topologies.

Although the embodiments described above refer to bidirectional communication links, e.g. single-fiber communication, between nodes, it is noted that nodes may comprise a plurality of fibers between nodes, wherein one or more of such fibers carry bidirectional signals between nodes. The described examples, e.g. bidirectional signals, alternating of wavelengths and 4-port filters are implemented on a single one only of the one or more fibers.

Although the embodiments described above have referred to first and second wavelengths of 1490 nm and 1510 nm, it is noted that these are merely examples for illustrative purposes, and that other wavelengths, or other wavelength pairs may be used for each respective bidirectional communication.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A network node for use with a bidirectional communication link, the network node comprising:
   a filter comprising at least four ports, wherein:
   a first port is configured to optically communicate with the bidirectional communication link in a first direction;
   a second port is configured to optically communicate with the bidirectional communication link in a second direction;
   a third port is configured to optically add/drop at least a wavelength in/from the first direction; and
   a fourth port is configured to optically add/drop at least a wavelength in/from the second direction; and
   wherein the network node is configured to add a first wavelength or a first set of wavelengths to the first direction and the second direction, and configured to drop a second wavelength or a second set of wavelengths from the first direction and the second direction;
   wherein the first wavelength and second wavelength are transposed compared to a first wavelength and a second wavelength of an adjacent node coupled to the bidirectional communication link, or wherein the first set of wavelengths and second set of wavelengths are transposed compared to a first set of wavelengths and a second set of wavelengths of an adjacent network node coupled to the bidirectional communication link; and
   wherein the bidirectional communication link forms part of a fronthaul network and the network node forms part of a fronthaul node.

2. The network node of claim 1, wherein a set of wavelengths comprises an interleaved set of add and drop wavelengths.

3. The network node of claim 1, further comprising:
   a first filter module coupled to the third port, the first filter module configured to:
   add the first wavelength or a first set of wavelengths to the first direction; and
   drop the second wavelength or a second set of wavelengths from the first direction; and
   a second filter module coupled to the fourth port, the second filter module configured to:
   add the first wavelength or a first set of wavelengths to the second direction; and drop the second wavelength or a second set of wavelengths from the second direction.

4. The network node of claim 3, wherein the first filter module and/or the second filter module comprises one or more filters, one or more wavelength division multiplexing (WDM) filters, or one or more coarse wavelength divisional multiplexing (CWDM) filters.

5. The network node of claim 1, wherein the first port is coupled to the third port.

6. The network node of claim 1, wherein the second port is coupled to the fourth port.

7. The network node of claim 1, wherein the first port and the second port are coupled via an optical reflected express path.

8. The network node of claim 1, wherein the bidirectional communication link comprises a single fiber.

9. A method in a network node for bidirectional communication via a four port filter, the method comprising:
communicating with a bidirectional communication link in a first direction via a first port;
communicating with the bidirectional communication link in a second direction via a second port;
adding/dropping at least a wavelength in the first direction via a third port; and
adding/dropping at least a wavelength in the second direction via a fourth port; and
wherein the steps of adding/dropping comprise:
adding a first wavelength or first set of wavelengths to the first direction and the second direction; and
dropping a second wavelength or second set of wavelengths from the first direction and the second direction;
wherein the first wavelength and second wavelength are transposed compared to a first wavelength and a second wavelength of an adjacent node coupled to the bidirectional communication link; or
wherein the first set of wavelengths and second set of wavelengths are transposed compared to a first set of wavelengths and a second set of wavelengths of an adjacent network node coupled to the bidirectional communication link; and
wherein the bidirectional communication link forms part of a fronthaul network and the network node forms part of a fronthaul node.

10. The method of claim 9, further comprising:
using a first filter module, coupled to the third port, to add the first wavelength or first set of wavelengths to the first direction, and to drop the second wavelength or second set of wavelengths from the first direction; and
using a second filter module, coupled to the fourth port, to add the first wavelength or first set of wavelengths to the second direction, and to drop the second wavelength or second set of wavelengths from the second direction.

11. The method of claim 10, wherein adding and/or dropping comprises:
using one or more filters to filter a wavelength;
using one or more wavelength division multiplexing (WDM) filters to filter a wavelength; or
using a coarse wavelength divisional multiplexed (CWDM) filter to filter a wavelength.

12. The method as of claim 9, wherein the bidirectional communication link comprises a single-fiber communication link.

13. A communication network comprising:
at least first and second network nodes coupled by a bidirectional communication link;
wherein the first network node and the second network node comprise 4-port filters for communicating via the bidirectional communication link,
wherein a 4-port filter of the first network node is configured to add a first wavelength or first set of wavelengths to the bidirectional communication link in both a first direction and a second direction, and drop a second wavelength or second set of wavelengths from a first direction and a second direction,
a 4-port filter of the second network node is configured to add the second wavelength or second set of wavelengths to the bidirectional communication link in both a first direction and a second direction, and drop the first wavelength or first set of wavelengths from the first direction and the second direction, and
wherein the communication network forms part of a fronthaul network, and the first network node and/or second network node forms part of a fronthaul node.

14. The communication network of claim 13, wherein the first network node and the second network node are adjacent nodes along the bidirectional communication link.

15. The communication network of claim 13, wherein the bidirectional communication link comprises a single-fiber communication link.

* * * * *